S. R. LOCKHART.
HOSE COUPLING.
APPLICATION FILED AUG. 31, 1910.

981,866.

Patented Jan. 17, 1911.

WITNESSES:
Emmett Mathews
L. E. Noack

INVENTOR
S. R. Lockhart
BY
Schleyer Weig
ATTORNEYS

UNITED STATES PATENT OFFICE.

SAMUEL R. LOCKHART, OF BUNA, TEXAS, ASSIGNOR OF ONE-HALF TO STEPHEN E. MILSTED, OF BUNA, TEXAS.

HOSE-COUPLING.

981,866.  Specification of Letters Patent.  Patented Jan. 17, 1911.

Application filed August 31, 1910. Serial No. 579,896.

*To all whom it may concern:*

Be it known that I, SAMUEL R. LOCKHART, a citizen of the United States, residing at Buna, in the county of Jasper and State of Texas, have invented certain new and useful Improvements in Hose-Couplings, of which the following is a specification.

This invention relates to new and useful improvements in hose couplings.

The object of the invention is to provide a simple coupling of superior construction and one in which a spring locking strap of particular construction is employed.

Another object resides in the provision of frictional material of a yieldable nature disposed in the locking slots whereby the locking pins are effectively held, but the wear of the same reduced to a minimum.

Finally the object of the invention is to provide means of the character described that will be strong, durable, efficient, and easy of operation, simple and comparatively inexpensive to construct, and also in which the several parts will not be likely to get out of working order.

Figure 1:
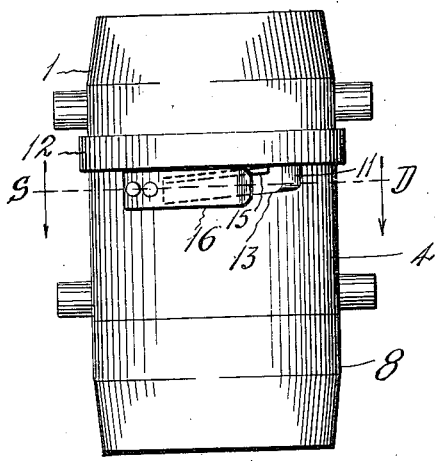
Figure 2:
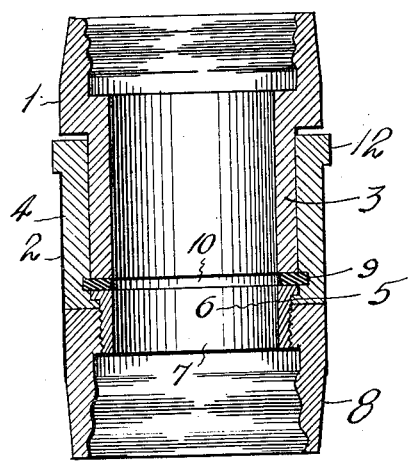
Figure 3:
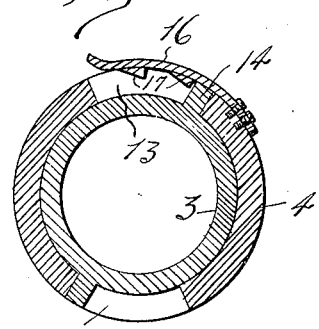
Figure 4:
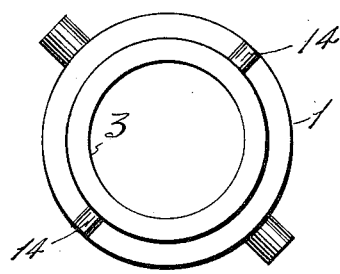
Figure 5:
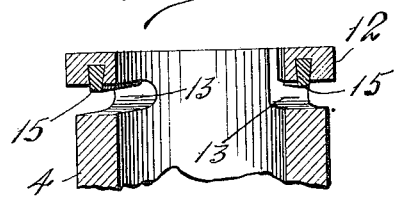
Figure 6:
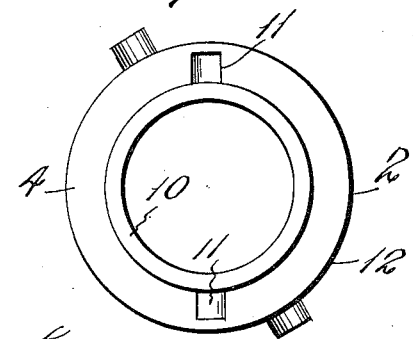

With the above and other objects in view, the invention has relation to certain novel features of construction and operation, an example of which is described in this specification and illustrated in the accompanying drawings wherein:

Figure 1. is an elevation of the coupling, Fig. 2. is a vertical section, Fig. 3. is a horizontal cross sectional view taken on the line S—D of Fig. 1, Fig. 4. is an inverted view of the male coupling member, Fig. 5. is a detail in section showing the locking slots, and Fig. 6. is a plan view of the female coupling member.

In the drawings the numeral 1 designates a shouldered male coupling member having a cylindrical sleeve 3. This sleeve is adapted to enter the jacket 4 of a female coupling member 2 and to fit snugly therein. An inwardly directed annular flange 5 is formed on the lower end of the jacket and engages a corresponding external flange 6 on the upper end of a bushing 7. The bushing is screw threaded into the upper portion of a ferrule 8. In this way the bushing 7 and the ferrule 8 are fastened together and attached to the jacket, which latter however is free to be rotated.

The upper end of the member 1 and the ferrule 8 are suitably shaped interiorly to receive the ends of the hose which are secured therein in any approved manner. Flush with the top of the bushing 7 an annular groove 9 is formed in the inner periphery of the jacket 4 and receives a ring 10 of packing material which extends inwardly over the bushing 7 and is impinged on its upper side by the lower end of the sleeve 3 when the member 1 is inserted in the member 2.

In the upper end of the jacket 4 diametrically opposite vertical slots 11 are formed. These slots do not extend to the outer surface of the shoulder 12 which is continuous and unbroken. Each slot terminates at the upper end of an inclined circumferential slot 13, which slots 13 extend in opposite directions. The slots 11 and 13 form an angular locking slot in each side of the jacket.

Locking studs 14 extend laterally from opposite sides of the sleeve 3. In locking the coupling members together the sleeve is inserted in the jacket so that the studs will pass into the slots 11. In the upper side of each slot 13 a strip 15 of packing material such as leather or rubber is secured with a portion projecting into the slot. When the male member 1 is turned the locking studs will ride along the edge of the strip 15 which while providing a frictional contact will reduce the wear on the studs to a minimum.

Owing to the inclination of the slots 13 the sleeve 3 will be drawn into the jacket 4 and its lower end firmly engaged upon the packing ring 10. Over one of the slots 13 a spring locking strap 16 is secured and on its inner side a pair of spaced dogs 17 are secured and project into the slots. The locking stud rides over these dogs which are sprung outward and fall in behind the stud. Two dogs are provided for the reason that if the stud is not moved the full length of the slot 13 in coupling the members, said stud will be engaged behind the first dog and a locking engagement assured. When it is desired to uncouple the members the operator has merely to spring the strap 15 outward which will move the dogs out of the path of the stud. It is unnecessary to have two locking straps and they only cause more work for the operator in uncoupling the members. By employing the dogs it is not necessary to exactly register the stud with an aperture or the like in the locking strap and enough play is allowed to permit a free engagement. The strips 15 are of particular advantage as they reduce wear, prevent play and tend to hold the parts in closer relation.

What I claim is:

1. A hose-coupling, comprising a female member composed of a jacket, a ferrule, and an internal bushing secured in the ferrule and having turning engagement with the jacket, said jacket having angular slots at its free end, strips of soft material extending into the slots, a locking strap extending over one of said slots, a male member composed of a cylindrical sleeve adapted to enter the jacket of the female member, and lateral studs extending from the sleeve of the male member adapted to enter the slots and engage the strips of soft material, one of said studs engaging the locking strap.

2. A hose-coupling, comprising a female member having angular locking slots extending inward from one end, a spring locking tongue extending over one of the slots and having a pair of spaced dogs normally extending into the slots, a male member having a cylindrical sleeve adapted to enter the female member, and lateral studs extending from the sleeve of the male member adapted to enter the slots of the female member, one of said studs engaging behind a dog of the locking tongue.

In testimony whereof I have signed my name to this specification in the presence of two subscribing witnesses.

SAMUEL R. LOCKHART.

Witnesses:
M. A. RICHARDSON,
C. PAYNE.